United States Patent [19]
Purcell et al.

[11] 3,802,530
[45] Apr. 9, 1974

[54] TRACTOR CAB

[75] Inventors: William F. H. Purcell, New York; James M. Conner, Mamaroneck; Charles W. Pelly, Scarsdale, all of N.Y.

[73] Assignee: Deere & Company, Moline, Ill.

[22] Filed: Apr. 26, 1972

[21] Appl. No.: 247,817

[52] U.S. Cl............... 180/89 R, 296/28 C, 296/146
[51] Int. Cl............................................. B62d 33/06
[58] Field of Search................ 296/28 C, 102, 146; 180/89 R, 89 A; 16/150

[56] References Cited
UNITED STATES PATENTS

| | | | |
|---|---|---|---|
| 3,656,799 | 4/1972 | Malm et al. | 180/89 R |
| 2,699,223 | 1/1955 | Brumbaugh | 180/89 A |
| 1,963,941 | 6/1934 | Duffy | 16/150 X |
| D113,554 | 2/1939 | Erickson | 296/28 C |
| 3,341,247 | 9/1967 | Martinmaas | 296/28 C |
| 3,397,008 | 8/1968 | Timmerman | 296/28 C |
| 3,410,599 | 11/1968 | Kettler | 296/28 C |

FOREIGN PATENTS OR APPLICATIONS

| | | | |
|---|---|---|---|
| 1,306,127 | 9/1962 | France | 296/28 C |
| 290,474 | 4/1953 | Switzerland | 296/28 C |

*Primary Examiner*—David Schonberg
*Assistant Examiner*—John A. Pekar

[57] ABSTRACT

A tractor cab includes a curved front formed partially of a fixed framework and partially of a door, the framework and door cooperating to support a windshield. The door is mounted for movement into and out of blocking relationship to a door opening permitting ingress to and egress from the interior of the cab along a path extending parallel to the centerline of the tractor between a control support structure and one side wall of the cab. The cab further includes frameless side and rear windows secured along their top edges by rubber hinges.

20 Claims, 3 Drawing Figures

TRACTOR CAB

BACKGROUND OF THE INVENTION

The present invention relates to a tractor cab and more particularly relates to a cab having structural members placed so as to define a door opening affording easy ingress and egress to and from the interior of the cab, the structural members at the same time being placed advantageously from the standpoint of permitting unblocked vision of a seated operator locking toward selected areas outside of the cab.

The use of cabs on tractors is becoming more and more prevalent in view of an increased awareness of the value of making an operator comfortable in order that he accomplish the amount of work capable of being done by the tractor being operated.

Most tractor cabs now in use are more or less box-shaped with the front and opposite sides of the cab being joined at front corner structures respectively transversely spaced from the opposite lateral sides of structure for supporting tractor controls. This location of the front corner structures is somewhat undesirable since it partially blocks the respective areas located between the rear wheels and the front of the tractor from the view of the operator.

Also one of these front corner structures usually bounds one side of a door opening located in the adjacent cab side, the opening being in direct confrontation with the tractor control support structure thus requiring the operator to immediately change direction as he enters the cab. This, of course, is undesirable since the operator is more likely to catch his foot on foot pedals, or the like, normally located at the opposite sides of the console.

SUMMARY OF THE INVENTION

According to the present invention, there is provided a tractor cab constructed so as to permit unblocked viewing of certain areas outside of the cab and to permit easy ingress and egress to and from the interior of the cab.

It is an object of the invention to provide a tractor cab permitting unblocked viewing of the area located between the rear tractor wheels and the front of the cab.

Another object is to provide a cab, as above-described, permitting ingress and egress to the cab along a path extending generally parallel to the centerline of the tractor between one side of the cab and a control support structure.

A more specific object is to provide a cab having a front which is curved between opposite upright structural members defining the forward edges of the cab sides. It is to be understood that the term "glass" as used herein is intended to be inclusive of any material commonly used as a substitute for glass in window or windshield construction.

Still another object is to provide a cab having a curved front, as above described, wherein a substantial portion is in the form of a door extending between one of the upright structure members and the control support structure.

These and other objects will be apparent from the ensuing description and the appended drawings.

DESCRIPTION OF THE PREFERRED EMBODIMENT

Figure 1:
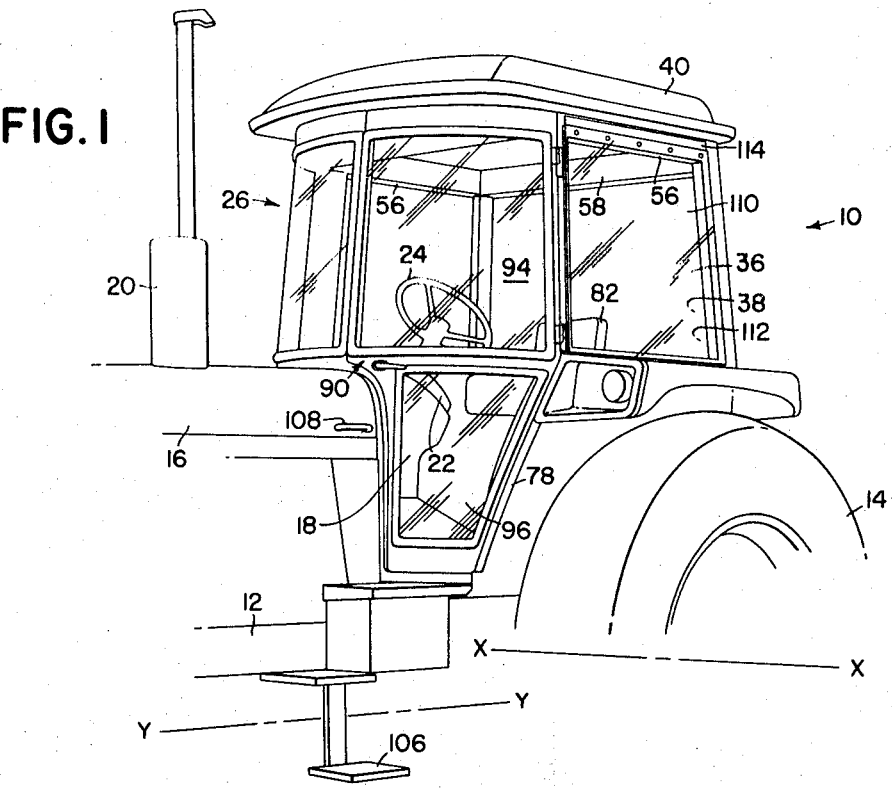
FIG. 1 is a three-quarter perspective view of the left front of a tractor cab shown mounted on a tractor.
Figure 2:
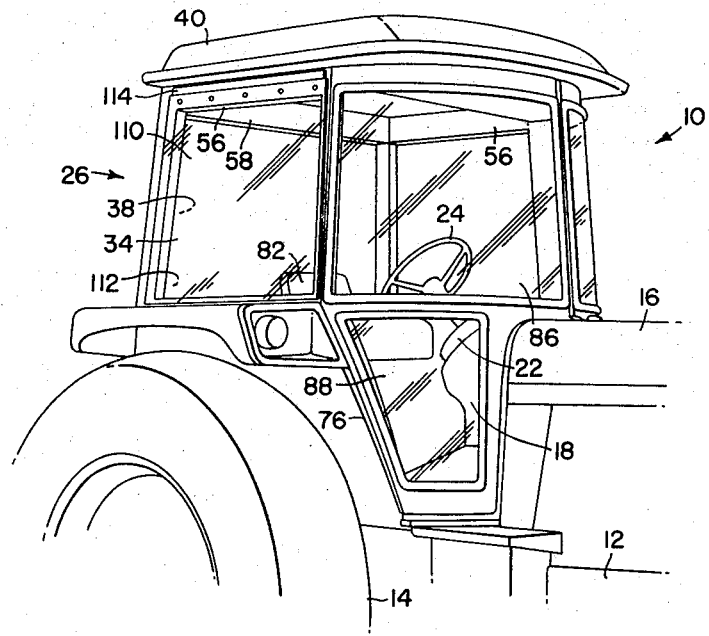
FIG. 2 is a view similar to FIG. 1 but being of the right front of the cab shown in FIG. 1.
Figure 3:
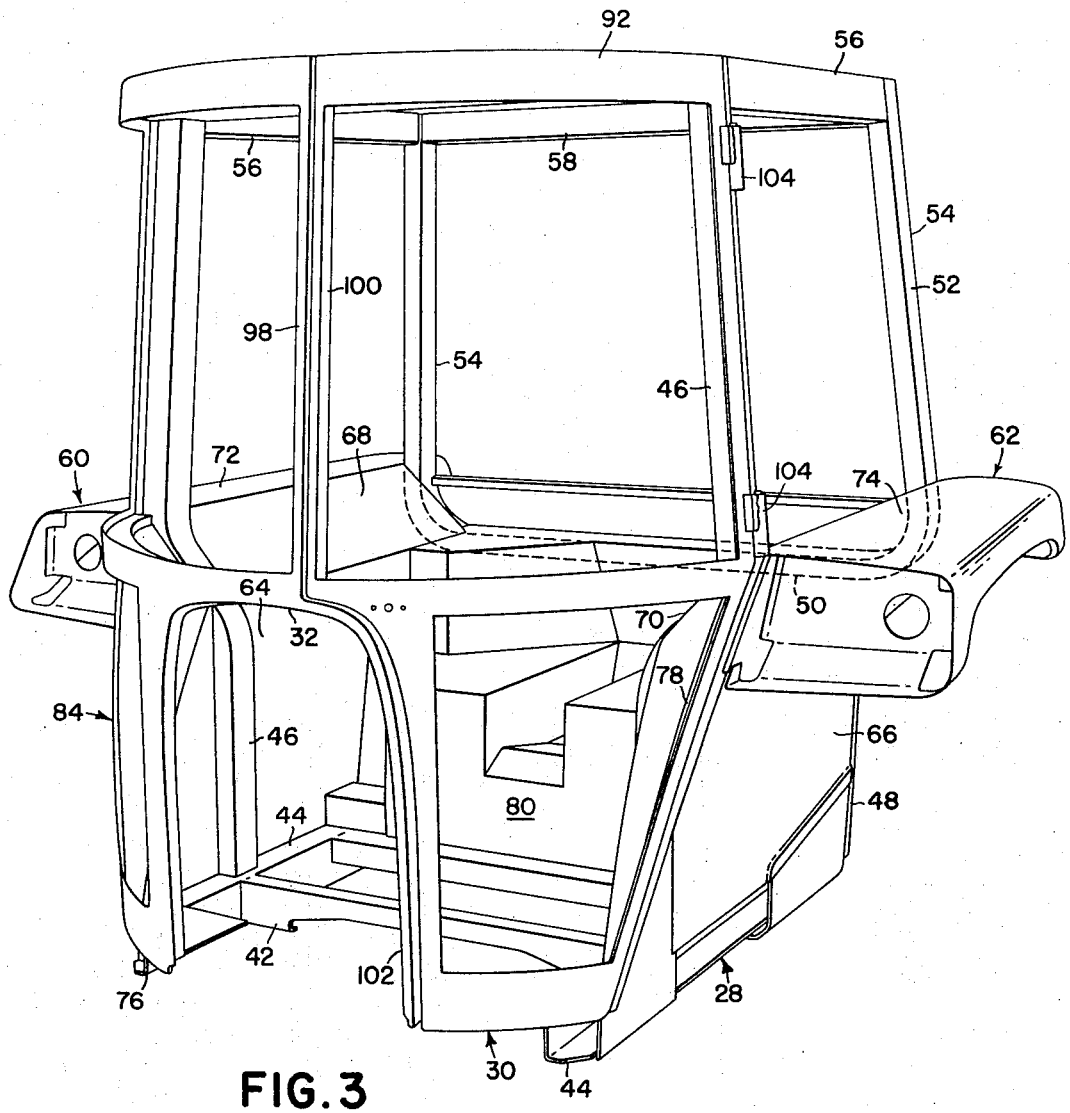
FIG. 3 is a perspective view of the cab frame structure shown removed from the tractor.

Referring now to FIGS. 1 and 2, there is shown a tractor designated in its entirety by the reference numeral 10. The tractor 10 includes a fore-and-aft extending main frame 12, including the tractor transmission and axle housings, supported at its forward end by front ground-engaging means (not shown) and adjacent its rearward end by a pair of rear drive wheels 14 rotatably secured thereto for rotation about a horizontal transverse axis X—X. Spaced vertically above and fixed to the forward portion of the frame 12 is a hood 16 from the rear end of which a tractor control support structure 18 continues rearwardly. The structure 18, as viewed from the tractor front, has an inverted U-shaped outline. A muffler 20 projects upwardly through the hood 16 in a manner usually found on agricultural tractors so as to eliminate the possibility of fires being started by the exhaust. Forming a rearward portion of the structure 18 is an instrument panel 22 having a steering structure 24 extending upwardly and rearwardly therefrom.

A cab 26 is mounted on the main frame 12 and includes a generally horizontal bottom 28 fixed between the rear wheels 14 and includes a front 30 containing an opening 32 in the lower front thereof which is shaped to conform to and is lined with seal material embracing the top and sides of the front portion of the control support structure 18. The cab 26 also includes left and right side walls 34 and 36, respectively, as viewed from the rear of the tractor, a rear wall 38 and a top 40.

The bottom 28 includes a generally rectangular bottom framework 42 having opposite lateral side members 44 extending parallel to and being equispaced from an imaginary fore-and-aft centerline Y—Y of the tractor a distance greater than the opposite lateral sides of the structure 18. The main support members of the side and rear walls of the cab includes a pair of forward upright members or posts 46 respectively connected to the pair of side members 44 at locations transversely opposite from the area occupied by the control support structure 18. Forming main support members at the rear of the cab are a pair of rearward upright members or posts 48 (only one shown) having bottom ends secured to the rear ends of the side members 44 and having top ends interconnected by a transversely extending bight portion 50 of a U-shaped member 52. The bight portion 50 extends laterally beyond the tops of the posts 48 to integrally formed upright legs 54 which cooperate with the posts 48 to form opposite rear corner structures of the cab. The cab includes horizontal top main frame members comprising a pair of opposite side members 46 respectively joining the upper end portions of the upright member 46 and leg 54 at one side of the cab and the upper end portion of the upright member 46 and the leg 54 at the other side of the cab; and a rear member 58 joining the upper end portions of the legs 54. The top 40 overlies and is fixed to the horizontal top frame members of the cab. The top 40 may form a housing containing air conditioning means (not shown).

Forming an integral part of the cab side walls 34 and 36 are fenders 60 and 62, respectively, including substantially vertical wall portions 64 and 66 respectively extending between the forward and rearward upright members 46 and 48 at the opposite sides of the cab, the upper edges of the portions 64 and 66 respectively blending into laterally outwardly upwardly inclined portions 68 and 70, which in turn blend into laterally outwardly extending horizontal portions 72 and 74 which overlie the wheels 14.

The vertical wall portions 64 and 66 have curved leading edges 76 and 78 which extend forwardly beyond the upright members 46 and are curved to generally follow the periphery of the wheels 14, as viewed from the side of the tractor.

A cab underbody 80 overlies approximately the rear half of the framework 42 and has opposite edges joined to the vertical wall portions 64 and 66. A seat 82 is supported, in a manner not shown, by the bight portion 50 of the U-shaped member 52 in fore-and-aft alignment with and spaced rearwardly from the steering structure 24. A floor (not shown) overlies and is supported by that portion of the framework 42 located forwardly of the underbody 80, the floor providing a relatively smooth walkway between the seat and cab door opening, the latter to be presently described.

The cap front 30 is curved and extends between lines defined at the opposite sides of the cab by upper portions of the forward upright members 46 and the leading edges 76 and 78 of the fenders. The right portion of the front 30, as viewed from the seat 82, is constructed of a curved front frame 84 supporting upper and lower curved glass panels 86 and 88, respectively, while the left portion of the front 62 is constructed of a door 90 having a framework 92 supporting upper and lower curved glass panels 94 and 96, respectively. The upper glass panels 86 and 94 cooperate to form a windshield providing a relatively unobstructed forward view, above the level of the hood 16, for an operator seated in the seat 82, the only obstruction being formed by an upright frame section 98 of the frame 84 bounding the left side of the glass panel 86 and an upright frame section 100 of the door framework bounding the right side of the glass panel 94. It is here noted that the upright frame sections 98 and 100 are slightly to the left of the tractor centerline Y—Y and are aligned with the exhaust muffler 20, as viewed by an operator seated in the seat 82, so as not to increase the obstruction of the operator's view beyond that already caused by the muffler.

The lower glass panels 88 and 96 are respectively located at the opposite sides of the tractor in the area extending between the leading edges 76 and 78 of the fenders and the control support structure 18 so as to provide a seated operator with an unobstructed view of the area located between the rear wheels 14 and the front end of the tractor.

The front frame 84 includes a slender downwardly projecting leg 102 which extends parallel to the left side of the cowling 18 and forms the left side of the cowling-receiving opening 32. The leg 102 cooperates with the upright frame section 98 to form the left edge of the frame 84, the right edge of the door 90 being shaped complementary to the left edge of the frame 84. The door 90 is swingably attached to the upper portion of the left forward upright member 46, as at hinge structures 104, for movement between a closed position, as shown, and an open position permitting ingress and egress to and from the interior of the cab along a path extending generally parallel to the tractor centerline Y—Y between the left cab side wall 36 and the left side of the cowling 18. Respectively secured to the left side of the tractor frame 12 and the hood 16 forwardly of the cab 26, for the purpose of aiding an operator in entering and leaving the cab, are a plurality of steps 106 and a hand-hold bar 108.

It is to be here noted that not only does the curved front 30 of the cab increase the visibility of areas forwardly of the cab over the visibility possible with relatively "square cornered" cabs but it also decreases the amount of area enclosed by the cab. This latter factor is important since it takes less air conditioner output to control the environment of the lesser area. Also, it is to be noted that the curved front 30 will tend to aid in the circulation of air being injected into the cab by the air conditioning system, thus resulting in more efficient operation than is possible in cabs including four relatively square corners.

For the purpose of providing maximum unobstructed lateral and rearward vision for an operator seated in the cab, an opposite pair of generally rectangular frameless glass panels 110 are located at the opposite sides of the cab while a generally rectangular frameless glass panel 112 is located at the rear of the cab. The glass panels 110 and 112 all have respective rubber strips 114 fixed to their upper edges, the upper edges of the strips 114 in turn being fixed to the respective top frame members 56 and 58. The rubber strips 114 are creased or grooved, in a manner not shown, to form a horizontal hinge axis permitting the glass panels 110 and 112 to be swung from their closed positions shown to open positions establishing a cross-ventilation condition within the cab.

The operation of the cab 26 is thought to be obvious from the foregoing discussion and for the sake of brevity no further description of the operation is given.

We claim:

1. A tractor and cab combination comprising: a generally horizontal, fore-and-aft extending tractor main frame centered relative to an imaginary tractor centerline; a pair of rear ground-engaging wheels being located at the opposite sides of and rotatably connected to the rear portion of the main frame; a hood being fixedly supported vertically above the forward portion of the main frame, a generally inverted U-shaped tractor control support structure being positioned adjacent to and forming a rearward continuation of the hood; a cab being mounted on the main frame between the rear wheels and including a top, a bottom, first and second laterally spaced fore-and-aft extending side walls, a rear wall and a front; said front including an upright front frame connected to said first side wall and extending therefrom to a forward portion of said control support structure; said front frame having a bottom edge defining a generally inverted U-shaped opening receiving the forward portion of said support structure and having an upright edge including a lower portion spaced slightly from and extending alongside and in general parallel relationship to the support structure and an upper portion extending upwardly to the cab top from the top of the support structure; said second side wall having an upright edge located transversely opposite said control support structure; said cab top and bottom and said front frame and second side wall edges cooperating to form a door opening permitting ingress and egress to and from the interior of the cab along a path extending generally parallel to the tractor centerline between the cab side wall and the support structure; and door means connected to one of said front frame and second side wall edges for movement between open and closed relationship to said door opening.

2. The invention defined in claim 1 wherein the door means is hingedly connected to said second side wall edge.

3. The invention defined in claim 2 and further including step means fixed to said main frame and handhold means fixed to said hood exteriorly of said cab and along said path for aiding an operator in entering or leaving the cab.

4. The invention defined in claim 2 wherein said cab front is concavely curved between the cab side walls, as viewed from the interior of the cab.

5. The invention defined in claim 4 wherein said door means includes a frame and wherein the door frame and said front frame respectively support first and second curved glass panels having horizontal upper and lower edges respectively located slightly below the cab top and slightly above the hood; and the first and second glass panels cooperating, when the door is closed, to form a windshield extending between the cab side walls.

6. The invention defined in claim 5 and further including a seat located in said cab rearwardly of said console structure and a muffler projecting upwardly through said hood; said first and second glass panels having upright edges respectively bordered by relatively narrow upright frame portions of the front frame and door frame; and said frame portions being located along an imaginary line of sight extending between a point located centrally above the seat and the muffler.

7. The invention defined in claim 6 wherein said seat is located along the tractor centerline; and said muffler and frame portions are located to one side of the tractor centerline.

8. The invention defined in claim 5 wherein said front and door frames respectively support third and fourth curved glass panels, the third glass panel extending transversely between the first side wall and the control support structure and having horizontal upper and lower edges respectively spaced slightly below and above the lower edge of the first glass panel and the cab bottom; said fourth glass panel, when the door is closed, extending transversely between the second side wall and the support structure and having horizontal upper and lower edges respectively spaced slightly lower and higher than the lower edge of the second glass panel and the cab bottom.

9. The invention defined in claim 8 wherein the first and second side walls each have lower forward edge portions which, when viewed from a side of the tractor, generally follow the periphery of the ground-engaging wheels.

10. The invention defined in claim 5 wherein the first and second side walls each include lower fore-and-aft extending portions forming first and second fenders, each of said fenders including a horizontal top forming an outward projection of the cab located above the rear ground-engaging wheels; and that portion of each of the side walls located above the adjacent horizontal fender top including a generally rectangular frameless glass panel; a strip of flexible material being fixed along the top edge of each of said frameless glass panels; said side walls each including a fore-and-aft extending upper frame member located immediately below the top of the cab; and each flexible material strip being fixed to a respective upper frame member.

11. The invention defined in claim 10 wherein said flexible material is rubber.

12. The invention defined in claim 1 wherein said cab front is concavely curved between the cab side walls, as viewed from the interior of the cab.

13. A tractor and cab combination, comprising: a generally horizontal, fore-and-aft extending tractor main frame centered relative to an imaginary tractor centerline; a pair of rear ground-engaging wheels being located at the opposite lateral sides of and rotatably connected to the rear portion of the frame leg means defining a horizontal transverse axis of rotation; an inverted U-shaped tractor control support structure supported on said main frame at a location spaced forwardly from said axis of rotation a distance greater than the radius of said ground-engaging wheels; a cab including a generally horizontal bottom frame structure being supported on said main frame between the rear ground-engaging wheels; said bottom frame structure having opposite fore-and-aft extending sides located from said tractor centerline a distance greater than opposite lateral sides of said support structure; first and second forward upwardly extending support members having lower ends respectively connected to the opposite sides of the bottom frame structure at locations laterally opposite from said support structure; first and second opposite side wall portions extending upwardly from and being respectively connected to the opposite sides of said bottom frame structure; said side wall portions having upper horizontal tops located approximately at the same level as the top of said support structure; said first and second side wall portions being respectively connected to said first and second support members and having forward edges extending forwardly of the support members but no further than the foremost peripheral portions of the wheels; said cab including an upright front including a front frame and a door, the front frame having a first upright side edge fixed integrally to the upper portion of said first forward support members and the forward edge of said first side wall portion and the door having a first upright side edge extending along the upper portion of said second forward support member and the forward edge of said second side wall portion; hinge means connecting said door to said second forward support; said front frame having a bottom edge containing an inverted U-shaped opening receiving said support structure; and said front frame and door respectively having upright side edges located on the opposite sides thereof from said first upright side edges, said second upright side edges being complementary shaped and located such that they meet each other when the door is in a closed position, along a line including a lower portion extending parallel and adjacent to that side of the support structure located closest to the door, whereby said door is swingable to an open position permitting ingress and egress to and from the interior of the cab along a path extending generally parallel to the tractor centerline between the second side wall portion and the support structure.

14. The invention defined in claim 13 wherein said cab front is concavely curved between imaginary lines defined at the opposite sides of the cab by the first upright edges of the front frame and the door when viewed from the inside of the cab with the door closed.

15. The invention defined in claim 14 wherein said door includes a frame and wherein the door frame and said front frame respectively support first and second curved glass panels having horizontal upper and lower edges respectively located slightly below the cab top and slightly above the control support structure; and the first and second glass panels cooperating, when the door is closed, to form a windshield extending between the upper portions of the first and second support members.

16. The invention defined in claim 15 and further including a hood extending forwardly from the tractor control support structure in vertically spaced relation to the main frame; a muffler projecting upwardly through said hood; a seat being located in said cab rearwardly of said support structure; said front frame and door having narrow upright frame portions including upper portion of said second upright edges and bordering said first and second glass panels; and, when said door is closed, said narrow upright frame portions being located along an imaginary line of sight extending between a point located vertically above the seat and the muffler.

17. The invention defined in claim 16 and further including step means fixed to said main frame and handhold means fixed to said hood exteriorly of said cab and along said path for aiding an operator in entering or leaving the cab.

18. The invention defined in claim 17 wherein said seat is located along the tractor centerline; and said muffler and frame portions are located to one side of the tractor centerline.

19. The invention defined in claim 16 wherein said front and door frames respectively support third and fourth curved glass panels, the third glass panel extending transversely between the first side wall portion and the control support structure and having horizontal upper and lower edges respectively spaced slightly below and above the lower edge of the first glass panel and the cab bottom frame; said fourth glass panel, when the door is closed, extending transversely between the second side wall portion and the control support structure and having horizontal upper and lower edges respectively spaced slightly lower and higher than the lower edge of the second glass panel and the cab bottom frame.

20. The invention defined in claim 19 wherein the forward edges of the first and second side wall portions each, when viewed from a side of the tractor, generally follow the periphery of the ground-engaging wheels.

* * * * *